April 22, 1952 F. A. CLARY, JR., ET AL 2,593,984
TENSION CONTROL AND STOP MOTION FOR STRANDED
WIRE CABLE MAKING MACHINES
Original Filed Feb. 12, 1948 4 Sheets-Sheet 1

Inventors
Frank A. Clary Jr
Grant N. Willis
BY
Owen W. Kennedy
Attorney

April 22, 1952   F. A. CLARY, JR., ET AL   2,593,984
TENSION CONTROL AND STOP MOTION FOR STRANDED
WIRE CABLE MAKING MACHINES
Original Filed Feb. 12, 1948   4 Sheets-Sheet 4

Fig.10.

Inventors
Frank A. Clary Jr.
Grant N. Willis
By
Owen W. Kennedy
Attorney

Patented Apr. 22, 1952

2,593,984

UNITED STATES PATENT OFFICE 2,593,984

TENSION CONTROL AND STOP MOTION FOR STRANDED WIRE CABLE MAKING MACHINES

Frank A. Clary, Jr., and Grant N. Willis, Bristol, Conn., assignors to Johnson Steel & Wire Company, Inc., Worcester, Mass., a corporation of Massachusetts Original application February 12, 1948, Serial No. 7,756, now Patent No. 2,546,977, dated April 3, 1951. Divided and this application May 19, 1949, Serial No. 94,062

5 Claims. (Cl. 57—58)

1

The present invention relates to the manufacture of stranded wire cable such, for example, as is used for reinforcement of the casings of rubber tires, power transmission belts, and other analogous uses which require a stranded wire cable of high tensile strength and of uniform wire lengths.

The present application is a division of our original application, Serial No. 7,756, filed February 12, 1948, and since issued on April 3, 1951, as Patent No. 2,546,977, for improvements in the manufacture of stranded wire cable, in which original application, there is disclosed a complete machine for continuously producing stranded wire cable, starting with a supply of untwisted wire at one end of the machine, and ending with the storage of finished cable at the other end. As will later appear, the machine of our original application is particularly charactertized by its ability to make completed cable at a high rate of production, and the object of the present invention is to provide improved mechanism for automatically controlling the withdrawal of wire from the individual wire supplies, so that each piece of finished cable will be composed of wires of equal length.

According to the present invention, this objective as to equal wire lengths is obtained by subjecting all of the wires entering into the completed cable to the pull of a single capstan, while controlling the withdrawal of wire from the individual wire supplies through the operation of automatically functioning tension devices. As a result, any piece of completed cable made by the machine will be composed of wires of equal length, so that tensile stresses will be uniformly distributed throughout each piece of cable.

In addition to maintaining the withdrawal of all of the wires under automatic tension control, the mechanism of the present invention also provides means for automatically stopping the machine should any wire break, or should an excessive pull be developed in any wire.

The above and other advantageous features of the present tension control and stop motion will be hereinafter pointed out in detail in the following description considered in connection with the accompanying drawings, in which.

2

Figure 1:
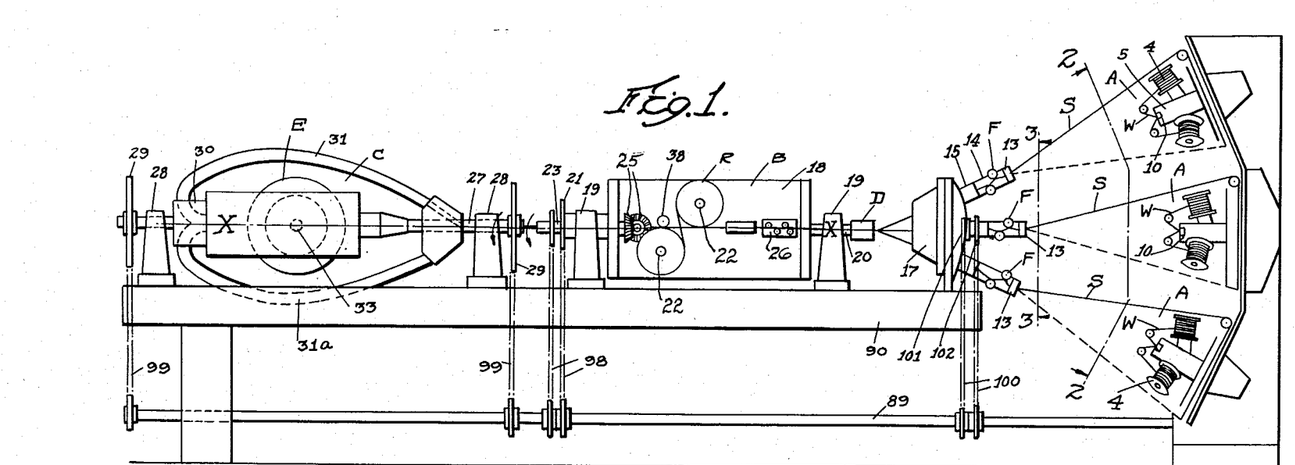
Fig. 1 is a view in side elevation of a complete machine for continuously producing wire cable from individual supplies of wire.

Referring to Fig. 1, there will be first described the general layout and mode of operation of the entire machine, without going into details of the various mechanisms which enter into the machine. Briefly stated, the machine consists of a number of individual wire stranders A, with the stranders A being arranged around an axis X—X about which a cable flyer C is rotatably driven to form cable from twisted wire strands S delivered by the stranders A. A cable-closing die D is located on the axis X—X between a flying capstan unit B and the stranders A, with each strand S passing through a false twister F on its way to the closing die D, so as to render the strand S inert. The flying capstan B is also rotatably driven about the axis X—X in unison with the flyer C, although at a different rotative speed, so that finished cable consisting of a number of twisted strands S is delivered to a cable storage spool E located inside the flyer C, and relatively stationary with respect to the flyer axis X—X.

Figure 2:
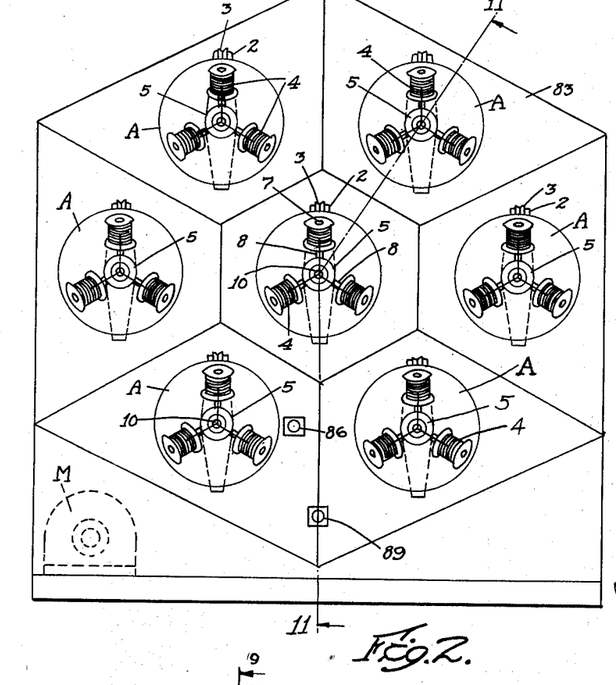
Fig. 2 is a view in end elevation of all of the individual stranders shown in Fig. 1, as viewed from the left, on an enlarged scale, along the line 2—2 of Fig. 1.

As shown in the right-hand portion of Fig. 1, the stranders A are in the form of separate units of identical construction, and a number of these stranders units are positioned in front of the closing die D. Fig. 2 shows the arrangement of stranders A about the axis X—X, with the number of stranders A depending upon the number of twisted wire strands S to be incorporated in the finished cable that is wound on the storage spool E.

Each strander A consists of a rotatably driven spindle 1 carrying a flyer 2 in the form of an arm having a pulley, or guide, 3 mounted at its end for the passage of a strand S containing a number of separate wires W. As best shown in Fig. 2, there are three wires W in each strand S, and these wires W are supplied from spools 4 arranged symmetrically about the axis of rotation of the spindle 1. The several spools 4 are carried by a cradle 5 that is supported freely on the outside of the spindle 1 by bearing 6, with each spool 4 mounted for rotation on a pin 7 extending radially from the center of the cradle 5.

While the cradle 5, with the spools 4, is relatively free to turn about the axis of the spindle 1, with the spools 4 in approximate balance, a counterweight 5a below the spindle axis Y—Y holds the cradle 5 against free rotation in the position of Fig. 2, wherein the heavy mass of metal represented by the several spools 4 of untwisted wire W is, to all intents and purposes, stationary with respect to the flyer 2 which is driven at a relatively high speed. At the same time, while the mass of metal on the spools 4 remains stationary with respect to rotation of the flyer 2, each individual spool 4 is capable of turning on the axis of its supporting pin 7 to permit the wire W to unwind from the spool in response to a simultaneous pull on all of the strands S through rotation of capstan rolls R, forming part of the flying capstan unit B later described in detail.

Figures 4, 5, 6:
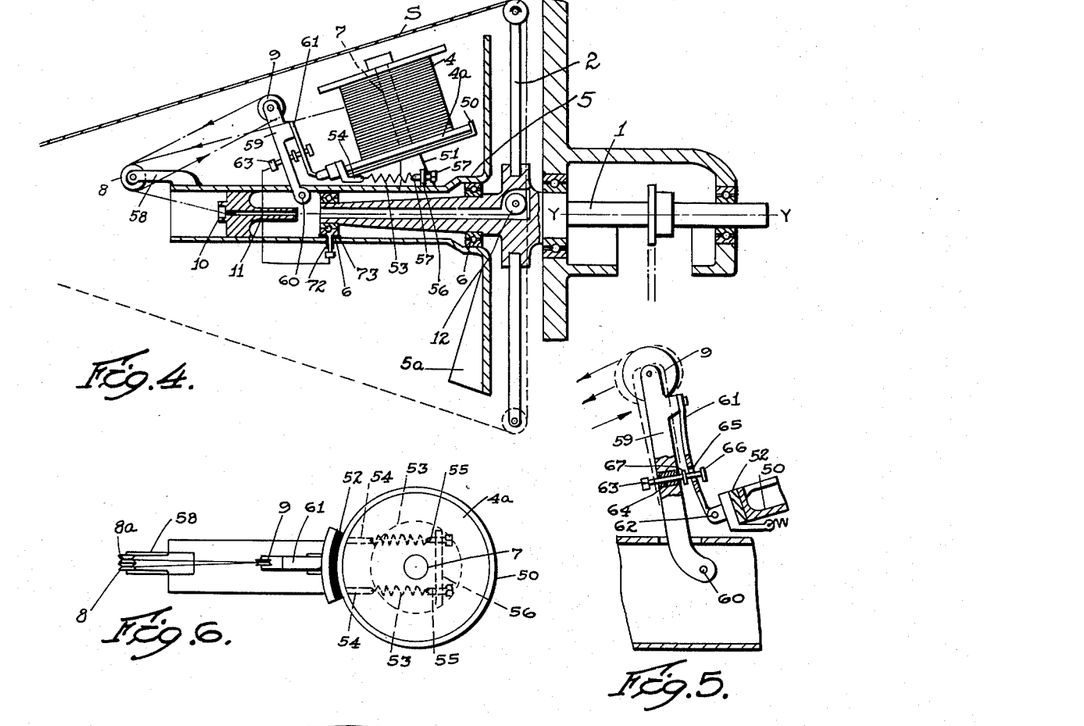
Fig. 4 is a vertical sectional view of one of the stranders shown in Fig. 1, on an enlarged scale, and illustrating the tension control for the individual wire supplies.
Fig. 5 is an enlarged detail view of one of the tension control elements.
Fig. 6 is a plan view of a portion of the parts shown in Fig. 4.

As best shown in Figs. 4 and 6, the untwisted wire from each spool 4 passes forwardly around a pulley 8 mounted to turn on a fixed axis at the front end of the cradle 5, from which pulley 8 the wire passes around a second pulley 9 forming part of the automatically functioning tension control device of the present invention. As later described in detail, this tension control device cooperates with the spool 4 to cause the wire to unwind evenly therefrom under the pull of the capstan rolls R. Since all of the tension control devices are identical in construction as regards each spool 4, the simultaneous functioning of the control devices insures that the three wires W entering into each strand S will be drawn off uniformly, so that in any given length of strand S, all the wires W therein will be of exactly the same length.

After passing around the tension control pulley 9, each wire W passes around a third pulley 8a mounted beside the first pulley 8, as shown in Fig. 6, which pulley 8a serves to conduct the wire to a closing die 10 located at the front end of the cradle 5. Therefore, all three wires W from the spools 4 converge upon the die 10, and a strand twist occurs at this point, the degree of which is determined by the rotational speed of the spindle 1 and the rate at which the wires W are pulled off the spools 4 by the rotatably driven capstan rolls R.

From the die 10, the strand S passes through a tube 11 which conducts it to the center of the spindle 1 and then around a pulley 12 rotatably mounted on the spindle 1, from which pulley 12 the strand passes radially outward to the guide pulley 3 at the end of the flyer arm. From this point, the strand S passes downwardly and forwardly outside of the spools 4 and cradle 5 to a strand-closing die 13 shown in Fig. 1 as being located on the axis Y—Y of each strander A. It is to be noted that the machine provides a number of such strand-closing dies 13, in accordance with the number of stranders A which are employed, with all of the strands S converging upon the cable-closing die D after passing through the several false twisters F.

With the above-described strander construction, rotation of a flyer 2 about the axis Y—Y will impart a double twist to the several wires W as the latter are drawn off of the spools 4 by the capstan rolls R, with the number of twists per minute being twice the speed of rotation of the spindle 1. It has been found that the spindle speed can be as high as 3500 R. P. M., so that each strand S can be twisted at a rate of at least 7,000 twists per minute, without setting up any dangerous centrifugal forces, due to the fact that the cradle 5 carrying the wire supply spools 4 is stationary, in so far as rotation of the spindle 1 is concerned.

As previously pointed out, each strander A has associated therewith a false twister F, as indicated in the general layout of Fig. 1, the purpose of which is to render each twisted strand S inert before entering the cable-closing die D upon which all of the strands S converge. Each false twister F consists of a pair of pulleys 14 that are mounted for free rotation on a carrier 15 that is positively driven about the strander axis Y—Y. The twisted strand S passes back and forth between the pulleys 14, so that as the pulleys 14 revolve bodily about the axis Y—Y, a twist will be put in the strand between the flyer pulley 3 and one false twister pulley 14, which twist will be removed from the strand between the other false twister pulley 14 and the cable-closing die D. The net result of the passage of a strand through the false twister F is to take the spring or torsion out of the strand S, so that it enters the cable-closing die D in an inert or dead condition.

As indicated in Fig. 1, the carrier 15 for each pair of false twister pulleys, as well as for the die 13, is mounted on a spindle 16, and all the spindles 16 are driven in unison at the same speed by suitable gearing enclosed within a casing 17. The several spindles 16 are hollow to permit the passage of the strands S therethrough as they leave the pulleys 14, so that all of the twisted strands S arrive at the cable-closing die D in an inert or dead condition, due to the uniform action of the false twisters thereon.

Figure 3:
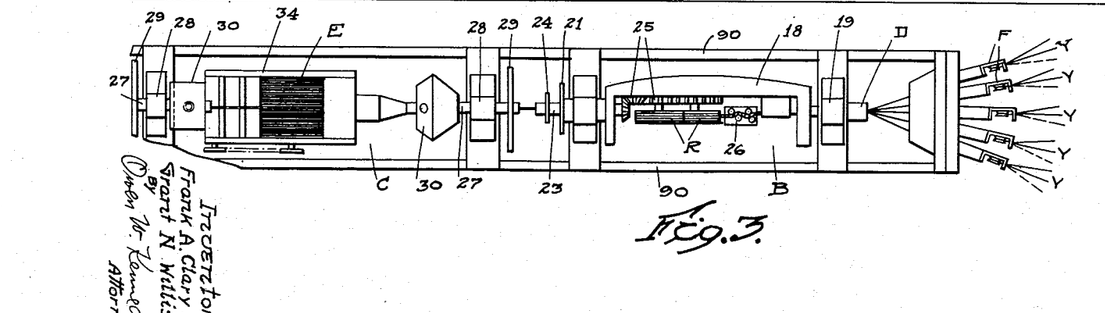
Fig. 3 is a fragmentary plan view of the machine shown in Fig. 1, with certain parts removed so as to show the cable storage drum more clearly.

The draft necessary to pull the individual wires W from the spools 4 of each flyer 2 and through the associated false twister F, is produced by the rotation of capstan rolls R forming part of the flying capstan unit B. As best shown in Fig. 3, the capstan unit B consists of an elongated body 18 supported between bearings 19 by trunnions 20, with the left-hand trunnion 20 carrying a driving sprocket 21. The right-hand trunnion 20 carries the cable-closing die D upon which all of the twisted strands S converge and the cable is formed at this point. Rotation of the cable flyer C about the axis X—X imparts the desired cable lay twist to the strands S as they are drawn through the cable-closing die D and the capstan body 18 by rotation of the capstan rolls R, simultaneously with revolution of the rolls about the axis X—X.

In order to positively rotate the capstan rolls R on their shafts 22, a spindle 23 is rotatable inside the left-hand trunnion 20, this spindle 23 being driven by a sprocket 24 at a speed greater than the speed at which the capstan body 18 is driven from the sprocket 21. The spindle 23 extends through the bearing 19 into the capstan body 18 and is connected by suitable gearing 25 to the capstan roll shafts 22, as indicated in Fig. 3.

The twisted cable passes back and forth around the capstan rolls R for a number of turns, and the higher speed of rotation of the spindle 23, with respect to the speed of rotation of the capstan body 18, causes the rolls R to be positively driven, and thereby draw the several twisted strands S into the cable-closing die D. The draft of the capstan rolls R is sufficient to simultaneously draw off all of the individual wires W from the spools 4 of the several stranders A, in cooperation with the tension control devices later described, so that any given length of strand S is made up of wires W of equal length. The draft of the capstan rolls R is also sufficient to pull the strands S through the false twisters F accompanied by closing and laying of the strands S into a cable at the die D, with the cable lay twist depending upon the speed of the flyer C and the rate of movement of the cable by the rolls R.

In its passage from the closing die D to the capstan rolls R, the twisted cable is subjected to the action of killing rolls 26 that are mounted and turnable with the capstan body 18. These killing rolls 26 are freely rotatable, and are arranged so as to face each other in staggered relation, thereby causing the cable passing between the rolls to be flexed in opposite directions. The rolls 26 are arranged in two sets with their axes at right angles to each other, as indicated in Figs. 1 and 3, and the rolls 26 will function in the manner of a conventional wire straightener to kill the torsion or spring in the cable, so that the twisted cable will emerge from the hollow spindle 23 at the end of the flying capstan unit B in an inert or dead condition.

Figure 7:
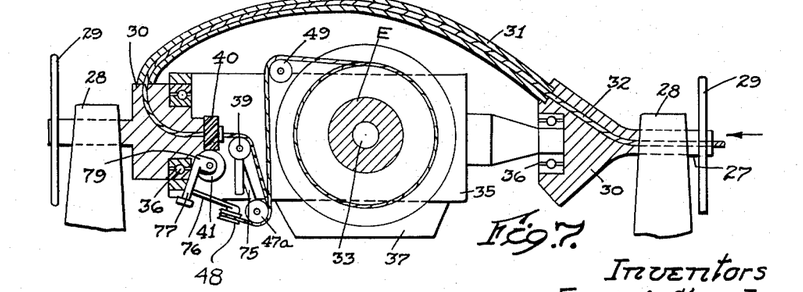
Fig. 7 is a vertical sectional view of the cable-storing flyer of Fig. 1, on an enlarged scale.

As best shown in the left-hand portion of Fig. 1, as well as in Fig. 7, the cable storing flyer C consists of a pair of aligned spindles 27 extending along the axis X—X and mounted in bearings 28. The spindles 27 are driven at the same speed through sprockets 29, and each spindle 27 carries a head 30 for receiving one end of a cable guiding tube 31 having a special form which will be described later. Rotation of the spindles 27 at the same speed will, therefore, cause the tube 31 to revolve about the axis X—X, and it is to be noted that the right-hand spindle 27 provides a passage 32 connecting with the right-hand end of the tube 31.

Figure 8:
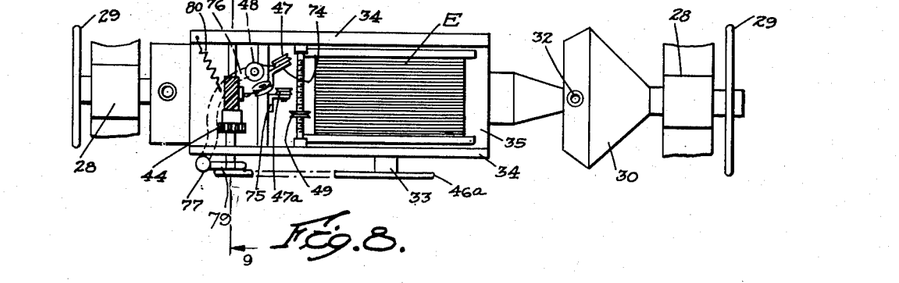
Fig. 8 is a plan view of the flyer shown in Fig. 7.

The cable storing spool E is mounted on a shaft 33 extending at right angles to the axis X—X, and as best shown in Fig. 8, the ends of the shaft 33 are mounted between the sides 34 of a cradle 35 that is supported freely between the heads 30 by bearings 36. The bottom of the cradle 35 provides a weight 37 which tends to stabilize the cradle and keep the spool shaft 33 always substantially horizontal, as rotation of the heads 30 carries the tube 31 around the spool E to deliver the cable to the spool with the desired amount of permanent twist.

An important factor in the ability of the machine to store the cable on the spool E without altering the cable twist, and without subjecting the cable to any appreciable pull, resides in the fact that the capstan rolls R deliver the finished cable to the flyer C at full cable closing speed. It is to be noted in Fig. 1 that a pinch roll 38 cooperates with the left-hand capstan roll R at its point of tangency along the axis X—X, so that the finished cable leaves the capstan unit without requiring any pull to draw it off. Therefore, the storage spool E is frictionally driven, as later described, so as to exert only enough pull on the cable to wind it on the spool at its delivery rate, without interfering with the necessary rotation of the cable in the flyer tube 31. In fact, the pull on the cable at the spool E is only one pound, as compared to at least forty pounds pull developed by the rotation of the capstan roll R, in order to draw the wires W from the several sets of supply spools 4, then the several strands S through the false twister F, and finally the twisted cable through the killing rolls 26.

While, as previously pointed out, the flyer C actually twists the cable, the cable lay is produced at the die D, due to the rotation of the capstan B in the same direction as the flyer C. Therefore, as the cable emerges from the capstan B, the cable itself is rotating at the speed of the capstan body 18, and as pointed out at length in our original application, the relative speeds of the flyer C and capstan B are such that no apparent twisting of the cable is produced between these two devices as the cable passes through the tube and emerges at a pulley 39 mounted on the cradle 35. This pulley 39 serves to guide the cable first through a tension control device and next to the spool E, with the cable then being free of self-rotation and having its original twist undisturbed.

For the purposes of the present application, it is sufficient to state at this point that the operation of the cable storing flyer C differs radically from the operation of a conventional revolving loop flyer, wherein a double twisting occurs between fixed points at opposite ends of the loop, as, for example, in the operation of the flyer 2 of each strander A. In the arrangement described above, with reference to the flyer C, the right-hand end of the loop in the tube 31 is free, as the self-rotating cable is fed into the spindle 27, and the tube 31 is so formed as to present easy curves to the passage of the cable, without offering resistance to its self-rotation. As a result, the cable arrives at the pulley 39 after its passage through the tube 31, without any self-rotation at that point, and without any untwisting of the cable strands having occurred during its passage through the tube 31.

Figure 9:
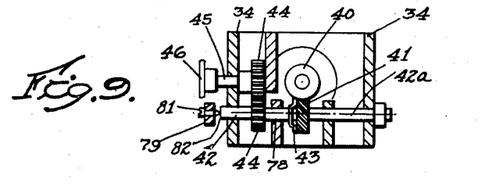
Fig. 9 is a vertical sectional view along the line 9—9 of Fig. 8, looking in the direction of the arrows.

As previously noted, the storage spool E, mounted in the cradle 35, is freely driven so as to be rotated on the axis of its shaft 33 at a speed sufficient only to wind the completed cable on the spool without substantial tension, as the cable is delivered to the pulley 39 by the operation of the capstan rolls R. The drive for the spool E is obtained from a helical gear 40 mounted on the end of the left-hand spindle 27, which gear 40 is in mesh with a helical gear 41 carried by a countershaft 42a that is mounted on one side of the cradle 35, as best shown in Fig. 9. A second countershaft 42 is in alignment with the shaft 42a, and a friction clutch 43 is interposed between the gear 41 and the end of the shaft 42. Intermeshing gears 44 are mounted on the shaft 42 and on a short shaft 45, respectively, with the shaft 45 extending from one side of the cradle 35 above and parallel to the countershafts. The shaft 45 extends through one side of the cradle, and carries a sprocket 46 connected to a second sprocket 46a on the spool shaft 33 by a chain indicated in dot and dash lines in Fig. 8.

The clutch 43 is automatically operated so as to transmit only enough power to the spool shaft 33 to cause rotation of the spool E to wind completed cable at the delivery rate of the capstan rolls R, without subjecting the cable to any appreciable tension, such as would interfere with its free self-rotation within the tube 31. In its travel between the pulley 39 and the storage spool E, the cable passes around a guide pulley 47 and a tension control pulley 48, the function of which is later described, after which the cable passes to a laying pulley 49 that is adapted to be traversed with respect to the spool E to build up the cable on the spool uniformly.

The fact that the completed cable is wound on the spool E at the delivery rate of the capstan rolls R without subjecting the cable to any appreciable tension, is an important factor in the operation of the whole machine to produce finished cable in which all of the wires entering into the cable are of equal length. This is so because the positively driven capstan rolls R function to generate a relatively high tension in the cable just beyond the closing die D. This tension is not only sufficient to draw the cable through the killing rolls 26 and the strands S through the false twisters F, but is also sufficient to work back through the individual wires W composing the strands, so that all the wires entering into the completed cable are subjected to the same tension to cause the wires to unwind uniformly from the supply spools 4, due to the automatic functioning of the tension control pulleys 9, as will next be described.

As previously pointed out, each strander A provides an arrangement for automatically controlling the unwinding of wire W from each spool 4, in accordance with the tension, or pull, as applied to the wire by the rotation of the capstan rolls R. The object of this arrangement is to insure that the three wires entering into each strand S will be drawn off uniformly, so that in any given length of strand S, the wires W therein will be all of the same length.

As best shown in Fig. 4, each spool 4 is mounted on a carrier 50 that closely fits one head 4a of the spool, so that the carrier 50 and its spool is supported, as a unit, for rotation on the pin 7 which extends outwardly from a lug 51 forming part of the cradle 5. The periphery of the carrier 50 is adapted to be engaged by a brake shoe 52, which is yieldingly held in engagement with the carrier by a pair of springs 53.

In the detail view of Fig. 6, the springs 53 are shown as extending underneath the carrier 50 on opposite sides of the pin 7, with the ends of each spring 53 connected to a lug 54 forming part of the brake shoe 52 and to an eye-bolt 55 passing through a fixed plate 56 on the cradle 5. A nut 57 cooperates with each eye-bolt 55, so that the tension of each spring 53 may be adjusted to balance the pull on the brake shoe 52 and to cause the brake shoe to frictionally engage the carrier 50 and exert an initial retarding force opposing free rotation of the spool 4. The initial adjustment of the springs 53 is such as to hold the spool 4 stationary on the pin 7, in the absence of any tension applied to the wire W to pull it off of the spool.

The wire W leads from the spool 4 to the fixed pulley 8 mounted on a bracket 58 projecting from the front end of the cradle 5. As previously noted, the wire, after passing around the pulley 8, goes to the pulley 9 which forms part of the tension control device that cooperates with the brake mechanism, described above, to automatically determine the amount of braking force applied to the spool carrier 50 in accordance with the tension in the wire. For this purpose, the pulley 9 is mounted for free rotation at the end of an arm 59 turnable on a fixed pivot 60 provided by the cradle 5. Since the wire W passes around the pulley 9 before again passing over the second pulley 8a on its way to the strand closing die 10, the arm 59 is subjected to a turning force in the direction of the arrow in Fig. 5, the degree of which force is a measure of the tension in the wire as it is drawn off of the spool 4 by the pull of the capstan rolls R.

The pulley arm 59 carries a leaf spring 61 extending in the direction of the brake shoe 52 and having its free end connected to the brake shoe by a pin 62. Therefore, any turning movement of the arm 59 in the direction of the arrow, under the pull of the wire W, will cause the application of a force through the spring 61, tending to lessen the pressure exerted by the brake shoe 52 against the carrier 50 under the pull of the springs 53.

Assuming that the tension of the springs 53 has been adjusted to hold the spool stationary, when wire is not being drawn off, it is apparent that a pull applied to the wire will cause this breaking force to be reduced. The amount that the arm 59 turns about its pivot 60, in response to the pull on the wire, will, in turn, flex the spring 61 and cause a certain amount of this force to be transmitted to the brake shoe 52, and thereby ease the pressure of the brake shoe on the spool carrier 50. The net result is that the retarding force applied to the spool 4 through the carrier 50 varies with the pull on the wire, so that the wire will be drawn off the spool 4 uniformly.

In view of the foregoing, it is obvious that the arm 59 carrying the pulley 9 is, at all times, responsive to the pull on the wire W. Therefore, the arm 59 will, during the normal operation of the strander, occupy some intermediate position between the two extreme positions indicated in dotted lines in Fig. 5, which dotted line positions illustrate abnormal conditions of operation.

Should the wire break, the arm 59 will move to the right, under the pull of the springs 53, whereas should an excessive pull be developed in the wire, due to binding or a snarl in the spool 4, the arm 59 will move to the left. Since the occurrence of either of these abnormal conditions should be followed promptly by stoppage of the machine, the present invention contemplates the provision of an electrically controlled stop motion responsive to movement of the arm 59 into either of the extreme dotted line positions shown in Fig. 5.

For this purpose, the arm 59 carries a contact stud 63 electrically insulated therefrom at 64, with the stud 63 passing through an opening 65 in the spring 61. As best shown in Fig. 5, the opening 65 is considerably larger than the stud 63 which carries contact disks 66 and 67 on opposite sides of the spring 61. These disks 66 and 67 are of greater diameter than the opening 65 in the spring 61, but during normal operation of the strander, the disks do not engage the spring. However, from the foregoing description of the functioning of the arm 59 in response to the pull on the wire W, it is obvious that one or the other of the contact disks 66 or 67 will engage the spring should the arm 59 move to either of the extreme positions indicated in dotted lines in Fig. 5.

Figure 10:
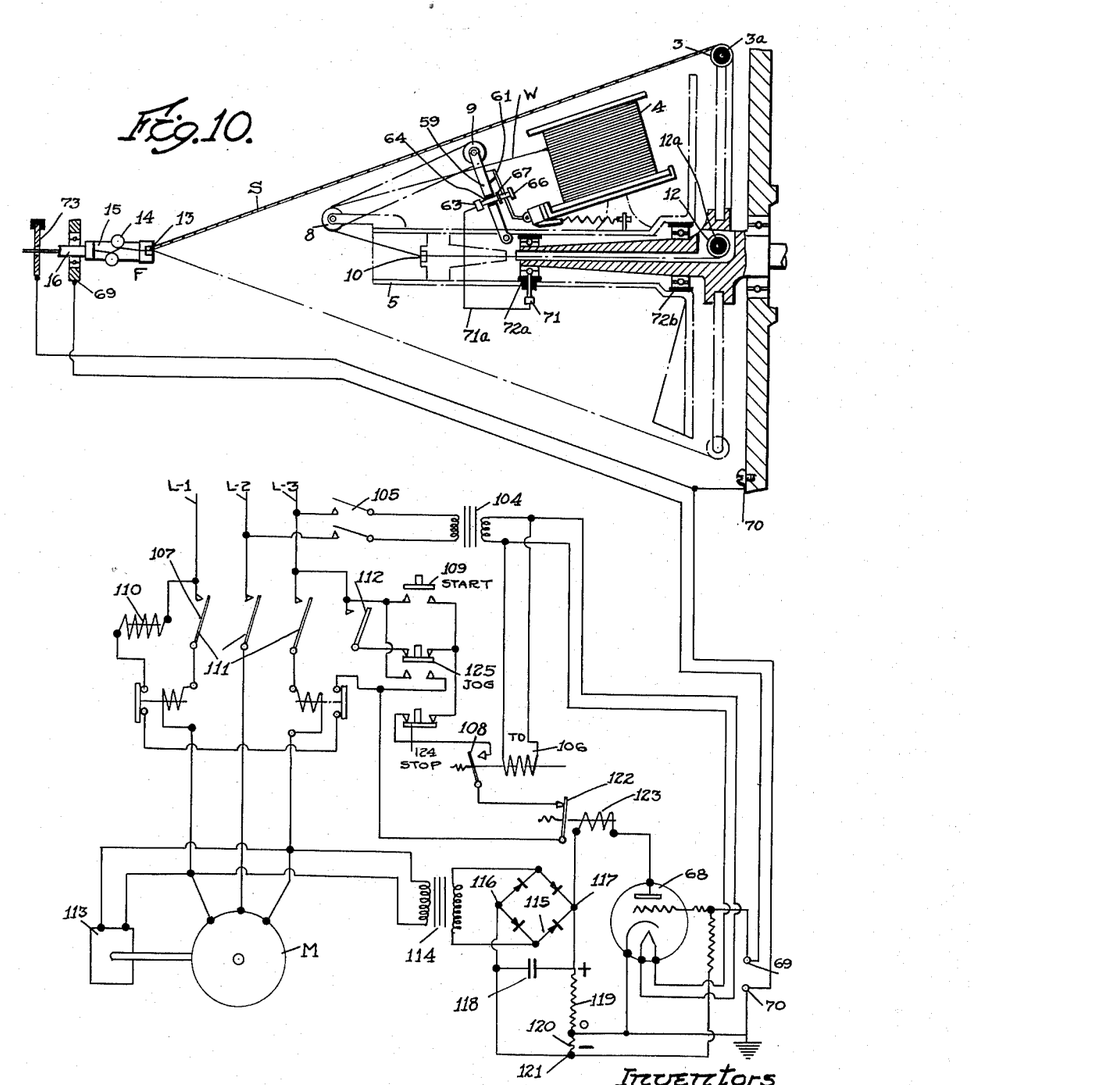
Fig. 10 is a wiring diagram of the control circuit for the driving motor, together with associated portions of the wire tension control forming part of the automatic stop motion for the machine.
Figure 11:
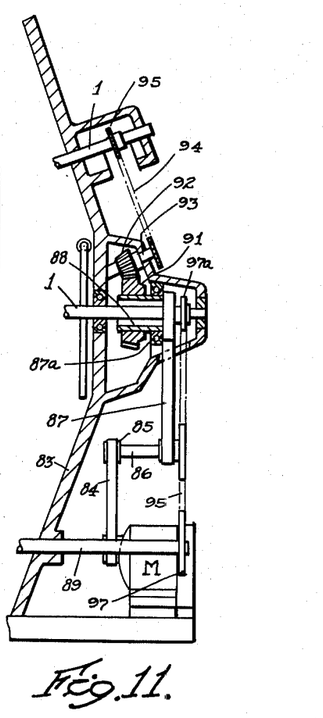
Fig. 11 is a vertical sectional view along the line 11—11 of Fig. 2, looking in the direction of the arrows.

The stud 63 and the contact disks 66 and 67 constitute part of an electrical control circuit for disconnecting and stopping the driving motor for the entire machine, which motor is indicated at M in Figs. 2 and 11. This control circuit is indicated diagrammatically in Fig. 10, which also shows associated portions of the strander which enter into the automatic functioning of the complete motor control. As will later appear, the control circuit functions to automatically disconnect the driving motor M, and to apply a suitable brake to bring the entire machine to a quick stop upon the occurrence of any of the abnormal conditions previously referred to, such as a break in the individual wires of a strander A, the development of excessive tension in any wire, or the occurrence of a break in a completed strand S.

For purposes of illustration, the control circuit is shown as comprising a quick-acting relay 68 in the form of an electronic tube shown in Fig. 10 as providing terminals 69 and 70 leading to the strander and forming part of the electrical circuit which includes the stud 63 and the contact disks 66 and 67. As will later appear, the functioning of the tube 68 in the motor control circuit is such as to automatically stop the machine whenever the terminals 69 and 70 become electrically connected together as a result of the occurrence of any of the abnormal conditions previously referred to with reference to the operation of the strander.

As indicated in Fig. 10, in which only related parts of the strander are shown, the tube terminal 69 is in continuous electrical contact with the moving strand S, and one way of accomplishing this result is by connecting the terminal 69 to the frame or housing which carries the false twister pulleys 14. With this connection, the terminal 69 will always be in electrical contact with the strand S through the pulleys 14, carrier 15, spindle 16, and the spindle bearings.

The other tube terminal 70 is connected to the frame member on which the strander spindle 1 is mounted, and this terminal is in electrical connection with the stud 63 carrying the contact disks 66 and 67, through the strander frame to the spindle 1, through its bearings, and then along the spindle to the outside bearing 6 for the cradle 5 to a contact post 71 connected to this bearing. A flexible lead 71a connects the post 71 to the stud 63, and during normal operation of the strander, the tube control circuit is open at this point because the contact disks 66 and 67 are out of engagement with the spring 61.

The spring 61 is in electrical connection with the other side of the tube control circuit, as represented by the terminal 69, through the arm 59, cradle 5, and strand closing die 10, carried thereby, where connection is established through the strand S and the false twister pulleys 14, as previously described. It is to be noted in Fig. 10 that the flyer pulley 3 and spindle pulley 12 are provided with insulating bushings 3a and 12a, respectively, to prevent the strand S from making contact with the spindle 1 at these points. Furthermore, the spool cradle 5 is insulated from the spindle 1 by sleeves 72a and 72b to prevent any electrical connection between the spindle 1 and the cradle 5 through the cradle bearings 6.

It is evident from the foregoing that so long as leaf spring 61 does not touch contacts 66 or 67, no electrical connection exists between terminals 69 and 70, under which conditions the motor control system is arranged to permit the machine to run continuously. Assuming that the machine is running to manufacture complete cable, and that a given strander A is operating normally, the control arm 59 of each spool of this strander will, in effect, oscillate between the dotted line positions of Fig. 5, in accordance with the pull on the wire. However, should the pull on the wire exceed a predetermined amount, as a result, for example, of a snarl in the wire on the spool 4, this excessive pull will swing the arm 59 to the extreme left-hand position indicated by dotted lines in Fig. 5. When this occurs, the contact disk 66 will engage the spring 61, thereby completing the circuit between terminals 69 and 70, and causing the motor control system to stop the driving motor M and apply a brake to bring the machine to a stop.

By reason of the above described functioning of the control circuit of the stop motion, the entire machine will be brought to a standstill before the pull can become so great as to break the wire. If, however, the wire should break for any reason, so that there is no pull exerted through pulley 9 to the arm 59, then the arm 59 will be turned to the extreme right-hand position indicated in dotted lines in Fig. 5. This movement will occur immediately following a break in the wire, due to the pull of the springs 53 on the brake shoe 52, thereby causing the contact disk 67 to engage the spring 61 and complete the circuit between 69 and 70, causing stoppage of the machine as previously described. It is to be noted that operation of the stop motion in response to a breakage of any wire of a spooler also results in an increase of the pressure applied to the spool carrier 50 by the brake shoe 52, so that the spool 4 will not overrun.

The action described above, however, will not stop the machine in the event of breakage of the completed strand S at any point between die 13 and pulley 12, since the strand itself is used to carry the stop signal. To insure stoppage of the machine upon breakage of S between these points, a contact plate 73 is located between false twister F and closing die D. This plate is provided with a clearance hole through which the strand passes without touching the plate when the strand is under tension and therefore straight, as in normal operation. Plate 73 is connected electrically to terminal 70, but is insulated from the rest of the machine. If the strand S breaks between pulley 12 and die 13, the portion of the strand between die 13 and cable-closing die D will become slack and will strike against the periphery of the clearance hole in plate 73, thereby establishing an electrical connection through the strand between plate 73 and false twister F, and hence between terminals 69 and 70. This causes the motor control to stop the machine, as later described in detail, through the functioning of the tube 68 as quick-acting relay to hold the motor circuit open, even though the closing of the circuit across terminals 69 and 70 be of extremely short duration.

As previously noted, the cable storage spool E is driven through an automatically controlled friction clutch 43, so as to transmit only enough power to the spool shaft 33 to cause the spool E to wind completed cable at the delivery rate of the capstan rolls R. In the absence of such a variable drive for the storage spool E, the pull on the cable through rotation of the spool would be decreased as the diameter of the bundle of cable on the spool increases.

As best shown in Figs. 7 and 8 which show the construction of the cable storing flyer C on an enlarged scale, the cable passes downwardly from the pulley 39 to a first guide pulley 47 mounted on a fixed bracket 74 attached to one end of the cradle 35. From the pulley 47, the cable passes around the tension pulley 48 and then back to a second guide pulley 47a which is mounted on a bracket 75 below the laying pulley 49.

The tension pulley 48 is carried at the end of an arm 76 which extends under the countershaft 42, as shown in Fig. 7, and is turnable on pivots 77, so that the pulley 48 is movable in a plane substantially at right angles to the plane of the second guide pulley 47a. It will be apparent from a consideration of Fig. 8, in which the arm 76 is shown in dotted lines, that the tension pulley 48 is located between the guide pulley 47a and the pivots 77 for the arm 76, so that the pull of the cable, as it is wound on the storage spool E, tends to turn the arm 76 in a clockwise direction, as viewed in Fig. 7.

Referring now to Fig. 9, it will be seen that the friction clutch 43 is mounted on the end of the countershaft 42 which also carries one of the gears 44 for driving the shaft 45 which, in turn, drives the spool shaft 33 through the sprockets 46. The countershaft 42 is capable of axial movement in its bearings 78, and the outer end of the countershaft 42 is normally subjected to a pressure for engaging the clutch 43 with the face of the driving gear 41. The arrangement for holding the clutch 43 engaged consists of an arm 79 which, as best shown in Fig. 8, is mounted on the same pivot 77 as the arm 76 and is turnable therewith. A spring 80 connected between the arm 76 and a fixed point on the cradle 35 serves to hold the free end of the arm 79 in engagement with the outer end of the countershaft 42, and thereby maintain the clutch 43 and gear 41 in engagement with a predetermined pressure. Small adjustments in the degree of this pressure can be made by means of a stud 81 at the end of the arm 79, which stud is pointed at its end so as to be received in a seat 82 in the outer end of the countershaft 42.

When the machine is started in operation to make completed cable for winding on the storage spool E, the pressure exerted by the arm 79 on the end of countershaft 42 is initially adjusted by the stud 81 so as to engage the clutch 43 with a predetermined pressure. This initial setting is such as to cause the clutch 43 to transmit only enough power to the spool shaft 35 to insure rotation of the spool E at a rate just sufficient to wind the cable at the delivery rate of the capstan rolls R, without appreciable tension. However, this initial setting of the clutch would not suffice to maintain a constant winding tension, because of the fact that as the diameter of the bundle of cable being wound on the spool increases, the spool would exert a reduced pull on the cable being wound.

With the above described mounting of the tension control pulley 48 on the arm 76, it is obvious that as the cable passes around the pulley 48 in its travel between the guide pulleys 47 and 47a, the arm 76 will be subjected to turning moment in a clockwise direction, as viewed in Fig. 8. This turning moment is opposite to the turning moment in a counterclockwise direction set up by the pull of the spring on the arm 79. Therefore, an increase in the tension on the cable as it is wound on the spool, will cause the arm 76 to turn clockwise against the pull of the spring 80, and thereby cause the arm 79 to exert a reduced pressure on the end of the countershaft 42, while a decrease in cable tension will result in an increased pressure.

The net result of the above described functioning of the tension control pulley 48 is that as the diameter of the bundle of cable being wound on the spool E increases, any tendency for the pull on the cable to decrease below the point where it will take up the cable at the delivery rate of the capstan rolls R, will be automatically compensated for by an increase in the pressure applied to the arm 79 by the pull of the spring 80. This results in an increase in the pressure exerted by the clutch 43 on the face of the driving gear 41. Therefore, as the winding of the cable proceeds, just enough power is transmitted to the spool shaft 33 to cause rotation of the spool E and winding of the cable thereon at a rate corresponding to the delivery rate of the cable by the capstan rolls R, all without appreciable tension in the cable being wound, such as would prevent its free rotation in the tube 31. It is also obvious that the winding of the cable without appreciable tension, insures that the completed cable will undergo no change in the lengths of the wires forming the same, which wire lengths are equal in any given length of cable, as a result of the automatic functioning of the tension control devices cooperating with each wire supply spool 4, as previously described.

As previously pointed out, the entire machine is driven from an electrical motor M, and the manner in which all the various parts of the machine are driven from the motor is indicated diagrammatically in Fig. 1, and in detail in Fig. 10. As shown, the motor M is mounted at the base of a frame 83 which carries the stranders A, with the motor being connected by a belt 84 to a pulley 85 on a power shaft 86. The shaft 86 is connected by a chain 87 and pulleys 87a to a sleeve 88 surrounding the spindle 1 of the central strander A, and this sleeve 88 is utilized to drive all the other stranders of the machine. The shaft 86 also serves to drive a countershaft 89 which extends along the machine beneath the frame 90 on which the false twisters F and flyers B and C are mounted.

As best shown in Fig. 11, the sleeve 88 of the central strander A carries a gear 91 in mesh with a gear 92 mounted on a short shaft 93 that is inclined with respect to the central spindle 1 and is parallel to the spindle of one of the stranders outside of the central strander on the frame 83. This arrangement is duplicated for each of the other stranders mounted on the frame 83, so that the spindle 1 of each strander A is driven through a chain 94 engaging with sprockets 95 on the short shaft 93 and each outside spindle 1, respectively.

The drive for the countershaft 89 is obtained from the power shaft 86 through a chain 96 and sprockets 97, with the chain 96 also driving the central spindle 1, through sprockets 97a. The countershaft 89 serves to drive the sprockets 21 and 24 of the flyer B and the sprockets 29 of the flyer C by means of the chains 98 and 99 indicated by the dot and dash lines in Fig. 1. The false twister spindles 16 are also driven from the countershaft 89 through the chains 100 and sprockets 101 and 102. The central spindle 16 is driven by sprocket 101, while the sprocket 102 drives the surrounding spindles 16 through suitable gearing 103 within the casing 17. Thus, all parts of the machine are driven from a common source of power represented by the motor M, with the gear ratios being such as to give the desired rotative speeds, as described in detail in our aforesaid original application, Serial No. 7,756.

In the previous discussion of the functioning of the electrical stop motion associated with each strander wire W, reference has been made to the control circuit for the motor M as represented by the wiring diagram of Fig. 10. This control circuit must meet certain requirements, the most important of which is that any closing of the circuit between terminals 69 and 70, must cause deenergization of the motor M and application of a brake, no matter how short the period of such circuit closing. Means must also be provided for manually starting or stopping the machine, or to operate the machine for short periods, even though the control circuit is open, as when "jogging" the machine preparatory to setting it up for normal operation.

Fig. 10 shows one way of fulfilling these requirements, wherein the circuit employs the previously mentioned gas-filled Thyratron tube 68. This tube, when operated from a source of direct current voltage has the property of acting as a rapid latch-up relay, i. e. once the tube fires and starts conducting from cathode to anode, current will continue to flow regardless of grid voltage, as long as plate voltage is present.

The filament voltage for the tube 68 is supplied from a transformer 104 upon closing of switch 105 leading to an alternating current supply, and a time delay relay 106 is also operated from this filament supply. The purpose of this relay 106 is to prevent the main magnetic contactor 107 from being closed until the filament of the tube 68 has had sufficient time to heat. After the time delay of relay 106 has lapsed, its contact 108 closes, and the machine may now be started, provided there is no circuit between points 69 and 70.

Closing of the "start" switch 109, a normally open momentary contact control button, causes the coil 110 of the contactor 107 to be energized, closing contacts 111 and 112. The contactor 107 locks in electrically through contact 112, and voltage is applied to the motor M and the magnetic brake 113, thus releasing the brake and starting the motor. Alternating current voltage is now applied to a tube supply transformer 114, the output voltage of which is applied to a bridge rectifier 115, which is of the copper oxide or selenium type, and this causes a direct current voltage to appear between points 116 and 117.

A filter condenser 118 is provided across the source of plate voltage supply between the points 116 and 117, and it will be seen that this source of voltage is impressed across a voltage divider consisting of resistors 119 and 120. This is done to create a source of negative grid bias voltage at point 121, with respect to the cathode of the tube 68. As long as no connection is made between points 69 and 70, this negative bias potential is impressed upon the control grid of tube 68, and is sufficient to prevent the tube from conducting. Thus, under conditions of normal operation, no current flows in the plate circuit of the tube 68, so that the contact 122 of a trip relay 123 remains closed and the machine continues to run.

Should control terminals 69 and 70 become electrically connected, even if only for 1/1000 second, due to abnormal operation of the cable-making machine as previously described, the grid of the tube 68 is brought to a positive potential with respect to the cathode and the tube fires, and remains conducting even though the previously closed circuit from 69 to 70 is reopened.

The flow of current in the plate circuit of the tube 68 causes relay 123 to be energized, which, in turn, causes its contact 122 to open. This breaks the lock-in circuit of the magnetic contactor 107, which was from L-1 through contactor coil 110, trip relay contact 122, time delay relay contact 108, "stop" button 124, "jog" button 125, and lock-up contact 112 of the contactor back to L-3. This causes the contactor 107 to open since its coil 110 is deenergized; this in turn deenergizes the motor M and applies the brake 113. It will also be seen that opening the contactor 107 cuts off the source of alternating current voltage to transformer 114, thus causing the tube 68 to be extinguished. This allows contact 122 to reclose, but the contactor 107 does not reclose because lock-up contact 112 is now open.

The machine can be inched by holding down the "jog" button 125 which by-passes the trip relay contact 122 and the time delay relay contact 108, but the contactor will not lock up. The circuit between terminals 69 and 70 must, however, be open before the machine may be started by the button 109, because trip relay contact 122 reopens immediately upon application of plate voltage to the tube 68, and the contact 122 will remain open for as long as the potential of the control grid of the tube is held positive, with respect to the cathode.

In the foregoing description of the electrical control for the driving motor M, it has been assumed that the entire machine would be driven by a single motor. It is obvious, however, that separate motors can be employed for driving the individual strander spindles 1 and the countershaft 89, thereby eliminating much of the gear and chain drives shown in Fig. 10. In the event of using an individual motor drive, the electrical control circuit shown in Fig. 13 would remain substantially unchanged, with all of the motors being connected to, or disconnected from, the power source through the functioning of the main contactor 107, as described above.

We claim:

1. Apparatus for the manufacture of stranded wire cable comprising in combination, means for supporting a plurality of spools of wire, means for imparting a predetermined strand twist to selected groups of wires, as drawn from said spools, a cable-storing drum, cable-forming means for imparting a predetermined cable lay twist to said strands and for guiding such laid cable toward said cable-storing drum, positively driven capstan rolls interposed between said wire supply spools and said cable forming means for drawing off wire from said spools and for feeding the same through said cable forming means to said cable-storing drum, means for driving said drum to wind cable thereon, without appreciable tension, means responsive to the pull on each wire, as it unwinds from its spool, for automatically controlling the application of a retarding force to each spool, whereby the complete cable formed from said wires is made of uniform wire lengths, and means responsive to the functioning of said wire pull operated means for automatically stopping the formation of a wire strand should the tension resulting from the pull in any wire exceed a predetermined value.

2. Apparatus for the manufacture of wire strands comprising in combination, means for supporting a plurality of spools of wire, with each spool being capable of rotation on its own axis as wire is withdrawn therefrom, means for bringing said wires together into a strand and for imparting a strand twist to wires drawn from said spools by carrying said wires about the spools, while the spool supporting means remains stationary, means responsive to the pull on each wire as it unwinds from its spool for automatically controlling the application of a braking force to each spool, and an electrical control circuit responsive to the functioning of said wire pull operated means for stopping the formation of a wire strand upon the breakage of any wire therein.

3. Apparatus for the manufacture of wire strands comprising in combination, means for supporting a plurality of spools of wire, with each spool being capable of rotation on its own axis as wire is withdrawn therefrom, means for bringing said wires together into a strand and for imparting a strand twist to wires drawn from said spools by carrying said wires about the spools, while the spool supporting means remains stationary, means responsive to the pull on each wire as it unwinds from its spool for automatically controlling the application of a braking force to each spool, and an electrical control circuit responsive to the functioning of the wire pull operated means for automatically stopping the formation of a wire strand should the tension resulting from the pull in any wire exceed a predetermined value.

4. Apparatus for the manufacture of wire strands comprising in combination, means for supporting a plurality of spools of wire, with each spool being capable of rotation on its own axis as wire is withdrawn therefrom, means for bringing said wires together into a strand and for imparting a strand twist to wires drawn from said spools by carrying said wires about the spools, while the spool supporting means remains stationary, means responsive to the pull on each wire as it unwinds from its spool for automatically controlling the application of a braking force to each spool, and an electrical control circuit responsive to the functioning of the wire pull operated means for automatically stopping the formation of a wire strand should the tension resulting from the pull in any wire exceed a predetermined value, or upon the breakage of any wire in a strand.

5. Apparatus for the manufacture of wire strands comprising in combination, means for supporting a plurality of spools of wire, with each spool being capable of rotation on its own axis as wire is withdrawn therefrom, means for bringing said wires together into a strand and for imparting a strand twist to wires drawn from said spools by carrying said wires about the spools while the spool supporting means remains stationary, means responsive to the pull on each wire as it unwinds from its spool for automatically controlling the application of a braking force to each spool, and an electrical control circuit responsive to the passage of a strand and to the functioning of the wire pull devices, for stopping the operation of the strand forming means upon the breakage of any wire or upon the development of a pull therein beyond a predetermined value.

FRANK A. CLARY, Jr.
GRANT N. WILLIS.

REFERENCES CITED

The following references are of record in the file of this patent:

UNITED STATES PATENTS

| Number | Name | Date |
|---|---|---|
| 691,797 | Norman | Jan. 28, 1902 |
| 723,806 | Avis | Mar. 31, 1903 |
| 1,824,464 | Berthier | Sept. 22, 1931 |
| 2,331,648 | Berggren et al. | Oct. 12, 1943 |
| 2,342,999 | Brownell | Feb. 29, 1944 |

FOREIGN PATENTS

| Number | Country | Date |
|---|---|---|
| 406,801 | Great Britain | Mar. 8, 1934 |
| 691,675 | Germany | June 3, 1940 |